Aug. 28, 1956 W. H. PEET 2,760,518
ACCUMULATOR
Filed Nov. 30, 1953 2 Sheets-Sheet 1
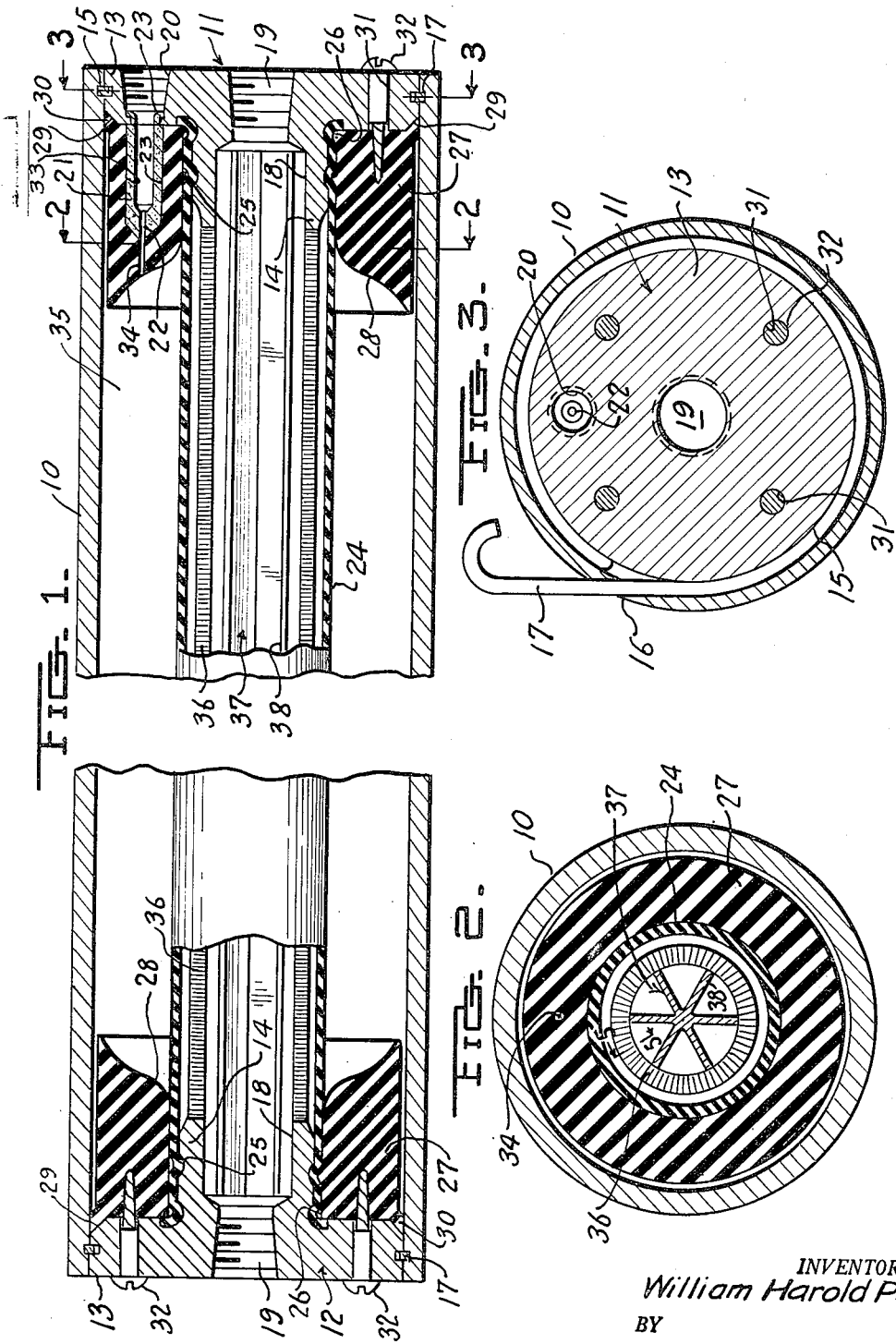
INVENTOR.
William Harold Peet
BY
ATTORNEYS Aug. 28, 1956  W. H. PEET  2,760,518
ACCUMULATOR
Filed Nov. 30, 1953  2 Sheets-Sheet 2

INVENTOR.
William Harold Peet
BY
ATTORNEYS

United States Patent Office 2,760,518
Patented Aug. 28, 1956

2,760,518

ACCUMULATOR

William H. Peet, Detroit, Mich.

Application November 30, 1953, Serial No. 394,978

15 Claims. (Cl. 138—30)

This invention relates to improvements in accumulators for fluid pressure actuated equipment.

It is an object of this invention to provide a compact accumulator composed of a relatively few simple parts and capable of producing exceptionally high discharge rates over long periods of use with a minimum of wear of said parts.

It is another object of this invention to provide an accumulator having a flexible diaphragm in the form of a tube and having a backing for the diaphragm also in the form of a permeable tube composed of wafer thin layers arranged in juxtaposition axially of the permeable tube in a manner to form passages for fluid between adjacent surfaces of the layers of such a restricted nature that extrusion of the diaphragm material through the permeable tube is prevented within the range of unit pressure applied to the diaphragm tube.

It is a further object of this invention to provide the diaphragm tube with a permeable backing tube having a multitude of passages for fluid extending substantially entirely around the permeable tube and affording sufficiently free flow of fluid in either direction through the permeable tube of avoid an appreciable pressure drop during operation of the accumulator.

It is still another object of this invention to prevent collapsing of the backing tube with a strut extending axially of the backing tube within the latter and having longitudinally extending fins arranged to engage the inner surface of the backing tube at points spaced equal distances from each other circumferentially of the backing tube. Thus, the diaphragm backing tube permits flow of fluid in either direction therethrough and at the same time is capable of withstanding exceptionally high pressures without damage.

It is a further object of this invention to provide an accumulator of the foregoing type rendering it possible to flow fluid through either or both ends of the accumulator.

It is a still further object of this invention to provide improved means for mounting the diaphragm tube within the accumulator casing to assure an effective fluid tight seal at each end of the diaphragm tube and to properly support the ends of the latter tube in the expanded position thereof.

The foregoing as well as other objects will be made more apparent as this description proceeds especially when considered in connection with the accompanying drawings, wherein.

Figure 1 is a fragmentary longitudinal sectional view through an accumulator constructed in accordance with this invention;

Figure 2 is an enlarged cross sectional view taken on the line 2—2 of Figure 1;

Figure 3 is a cross sectional view taken on the line 3—3 of Figure 1;

Figure 4:
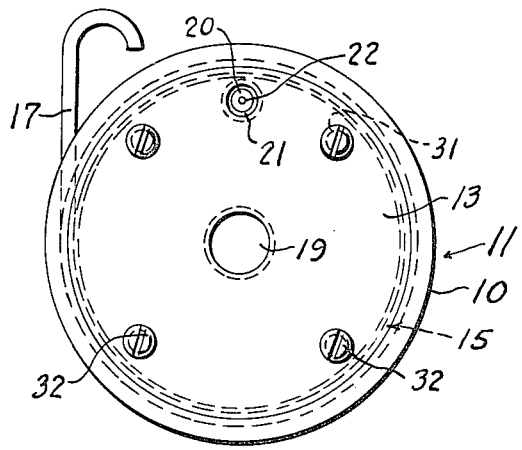
Figure 4 is an end elevational view of the accumulator shown in Figure 1.

The accumulator selected herein for the purpose of illustrating the present invention has an elongated cylindrical casing 10 open at opposite ends for respectively receiving heads 11 and 12. The head 11 is in the form of a plate having a peripheral portion 13 adapted to be sleeved into one end of the casing 10 and having a centrally disposed hub part 14 projecting axially inwardly from the cylindrical portion 13. As shown in Figure 3 of the drawings, the cylindrical portion 13 is fashioned with an annular groove 15 intermediate the ends thereof and the inner surface of the casing 10 is formed with a similar groove arranged to register with the groove 15. It will further be noted from Figure 3 of the drawings that the casing 10 is formed with an opening 16 which extends tangentially to the annular groove 15 and opens into the latter. A metal rod 17 is insertable into the opening 16 from the outer side of the casing 10 and is sufficiently ductile to enable conforming the same to the contour of the groove 15 as it is fed along the groove. The rod 17 provides a key which serves to secure the head 11 in assembled relationship with the casing 10.

The hub portion 14 on the head 11 has an axially extending bore 18 arranged in communication with an opening 19 formed in the head 11 and being of a diameter somewhat less than the bore 18. The peripheral portion 13 of the head 11 has a charging port 20 therethrough adapted for connection to a source of fluid under pressure such, for example, as air. The inner end of the port 20 communicates with the outer end of a nozzle 21 of sintered material having the inner end closed and provided with a restricted passage 22. The outer end of the nozzle 21 is reduced in diameter and is clamped over an annular shoulder 23 projecting into the bore 20.

The head 12 at the opposite end of the cylindrical casing 10 is identical to the head 11 with the exception that the intake port 20 and associated sintered nozzle 21 is omitted. Accordingly corresponding parts of the two heads are indicated by the same reference numerals.

Extending axially of the cylindrical casing 10 between the heads 11 and 12 is a diaphragm 24 in the form of a length of tubing preferably formed of an elastic material, such for example as synthetic rubber, having oil resistant characteristics. The opposite ends of the diaphragm tube 24 are respectively sleeved on the central hub portions 14 of the heads 11 and 12. As shown in Figure 1 of the drawings, each hub portion 14 is formed with axially spaced annular grooves 25 and the adjacent portions of the diaphragm tube are deformed into the grooves 25 by wrapping a relatively heavy gage thread 26 or swaging a metallic ferrule around the diaphragm tube to form a matrix with the grooves 25. In practice, the thread is permanently held in place by a suitable rubber cement. The construction is such as to provide fluid tight seals between opposite ends of the diaphragm tube 24 and the adjacent hub portions 14 on the heads.

Surrounding each end of the diaphragm tube 24 within the cylindrical casing 10 is a liner or ring 27 formed of a resilient material such, for example, as synthetic rubber. The radially inner surfaces of the rings 27 respectively encircle the bindings 26 at opposite ends of the diaphragm tube 24 and have a bearing engagement with the tube 24. The outer ends of the rings 27 abut the adjacent inner surfaces of the heads 11 and 12 and the axially inner ends of the rings are flared radially outwardly to provide contoured surfaces 28 which form a backing for the adjacent end portions of the diaphragm tube 24 when the latter is expanded within the casing 10. The construction is such that both rings 27 are deformable in response to the application of pressure thereto to not only effectively seal the annular joints between the heads and casing 10 but to also assist the bindings 26 in clamping opposite ends of the diaphragm tube 24 to the hub portions 14 on the heads. In this connection, it will be noted from Figure 1 that the inner surfaces of the peripheral portions 13 on the heads are chamfered to form annular grooves 29 with the adjacent inner surface of the casing 10 for respectively receiving annular lips 30 which project axially outwardly from the rings 27. Also, in order to assist sealing contact of the outer ends of the rings 27 with the respective heads, the latter are formed with relief holes 31 which prevent trapping air between the outer ends of the rings 27 and adjacent surfaces of the heads. Holes 31, in addition create an unbalancing force to be exerted outward on the rings 27 when subjected to pressure and inherently seals all joints. If desired, suitable screws 32 may be extended through the relief openings 31 and threaded into the adjacent rings 27 in order to minimize any tendency for the material from which the rings are formed to extrude through the relief openings 31. Referring again to Figure 1 of the drawings, it will be noted that the ring 27 adjacent the head 11 is formed with a bore 33 for receiving the sintered nozzle 21 and the bore 33 communicates with the interior of the casing 10 through a weep hole 34 formed in the aforesaid ring 27 in registration with the passage 22. Thus, air under pressure may pass through the sintered nozzle 21 into the bore 33 and from the latter into the interior of the casing 10 through the weep hole 34.

The air or fluid under pressure issuing from the weep hole 34 enters a chamber or space 35 surrounding the diaphragm tube 24 within the cylindrical casing 10 and acts on the diaphragm tube 24 tending to collapse the latter. Thus, the fluid previously introduced into the space defined by the diaphragm tube 24 is discharged through the openings 19 in the heads 11 and 12. In order to limit the extent of collapsing of the diaphragm tube 24, a backing tube 36 of permeable material is supported within the diaphragm tube 24 by the heads 11 and 12. As shown in Figure 1 of the drawings, the opposite ends of the backing tube 36 respectively abut the inner ends of the hub portions 14 on the heads and are secured to the heads by a strut 37. The opposite ends of the strut 37 respectively project into the bores 18 formed in the hub portions 14 of the respective heads and are secured to the latter.

The strut 37 may be extruded or otherwise formed from metal, such for example as aluminum, and in any case comprises a plurality of radially outwardly extending fins 38 from each other circumferentially of the backing tube 36. The radially outer edges of the fins 38 have a bearing engagement with the inner surface of the backing tube 36 throughout the full length of the latter and thereby prevent collapsing or deforming of the backing tube 36 by the pressures built up within the diaphragm tube 24 during operation of the accumulator. In addition, the fins 38 of the strut 37 cooperate to channel the flow of fluid in a direction axially of the permeable backing tube 36 and thereby reduce turbulence of the fluid to a minimum.

Figure 5:
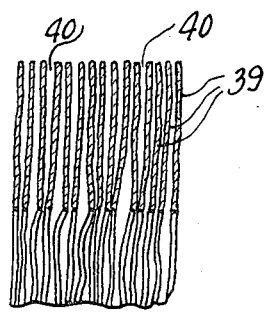
Figure 5 is an enlarged sectional view taken on the line 5—5 of Figure 2.

The backing tube 36 comprises a multitude of passages which enable the flow of fluid in either direction through the wall of the tube 36 and these passages are so restricted that the material from which the diaphragm tube 24 is formed is prevented from being extruded into the passages regardless of the unit pressure acting on the external surface of the diaphragm tube 24. The backing tube 36 shown in Figures 1 and 2 of the drawings has a permeable wall formed of a multiplicity of layers 39 arranged in juxtaposition axially of the backing tube 36 and having highly restricted passages 40 between adjacent surfaces of the layers. More particularly, the layers 39 are formed by a relatively thin ribbon of material wound in a helical manner around the strut 37 so that adjacent convolutions of the ribbon are arranged in supporting relationship to one another and provide fluid passages through the backing tube 36. These passages are indicated by the numeral 40 on a very much enlarged scale in Figure 5 of the drawings and permit the required flow of fluid in either direction through the wall of the tube 36. In practice, the ribbon is preferably wrinkled or corrugated to a slight extent in order to assure obtaining the passages 40 between adjacent convolutions of the ribbon and at the same time impart a rigidity to the ribbon.

Figure 6:
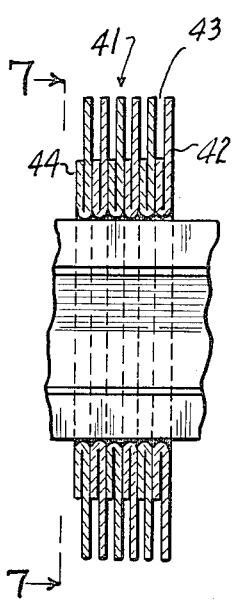
Figure 6 is a fragmentary longitudinal sectional view of a modified form of permeable tube.
Figure 7:
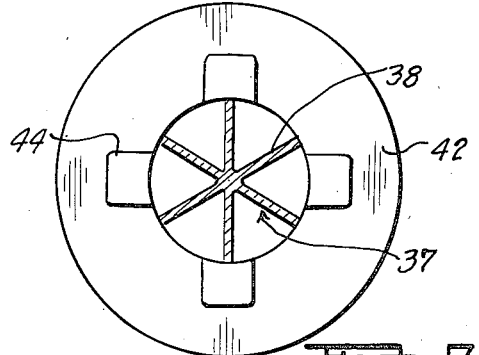
Figure 7 is a cross sectional view taken on the line 7—7 of Figure 6.

In Figures 6 and 7 of the drawings, a slightly modified form of backing tube 41 is shown. This tube comprises a multiplicity of rings 42 secured in coaxial relationship and having radially extending passages 43 between adjacent surfaces. In the present instance, the rings 42 are in the form of thin sheet metal stampings which have lugs 44 formed integral with the inner circular edges of the rings and bent radially outwardly to form spacers. The rings 42 are assembled so that the spacers on one ring abut the surface of an adjacent ring to provide the required passages 43.

In operation, at least one of the openings 19 is connected to a source of fluid under pressure, such for example as a hydraulic pump, so that the fluid under pressure enters one end of the permeable tube 36 and flows through the multitude of passages 40 in the wall of the tube 36 into the diaphragm tube 24. The diaphragm tube 24 is expanded by the fluid under pressure against the pressure of the fluid contained in the chamber 35 and acting on the outer surface of the diaphragm tube. The arrangement is such that the fluid contained within the confines of the diaphragm tube 24 may be stored for an indefinite period of time and may be used to actuate any desired hydraulic mechanism by disconnecting the opening 19 aforesaid from the source of fluid under pressure and connecting the same to the mechanism to be operated by the fluid under pressure. Since the expansion of the diaphragm tube 24 takes place against the pressure contained in the chamber 35 surrounding the tube 24 during the charging operation, it follows that an exceptionally high pressure in the chamber 35 is available for returning the fluid confined by the diaphragm tube 24 to the mechanism requiring operation.

It is apparent from the foregoing that fluid may flow through either or both ends of the accumulator and that two or more accumulators may be connected in series, if desired. It will also be noted that although the passages provided between adjacent layers or convolutions of the permeable tube 36 are of a highly restricted nature in order to prevent extrusion of any part of the tube 36 through these passages, nevertheless, the passages extend substantially completely around the tube 36 with the result that fluid flows relatively freely through the permeable wall of the tube 36 and very little pressure drop takes place even under full accumulator discharge.

Figure 8:
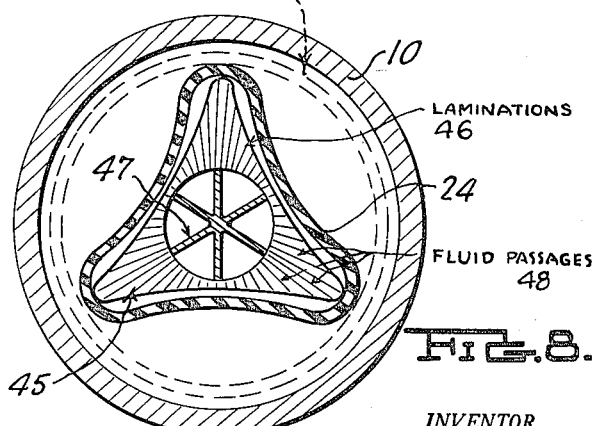
Figure 8 is a cross sectional view showing another embodiment of the invention.

The backing tube 45 in Figure 8 of the drawings also consists of a multiplicity of wafer thin laminations 46 arranged in juxtaposition in a manner similar to the laminations 42 in Figure 6, and supported by a strut 47 which may be identical to the strut 37 previously described. The laminations 46, however, have the adjacent surfaces formed with passages 48 which extend outwardly from the inner marginal edge of the central openings through the laminations 46 to the outer edges of the latter. The passages 48 may be formed by a coining operation and, in any case, provide for the flow of fluid through the walls of the tube 45. Also the exterior contour of the laminations 46 is generally triangular to impart a corresponding cross sectional contour to the backing tube 45 and the side edges of the laminations are concave to provide the tube 45 with correspondingly shaped backing surfaces for the diaphragm tube 24. This arrangement has the advantage of permitting the diaphragm 24 to deform to the contour of the backing tube without imparting undue elastic strain to the diaphragm during operation. The concave side edges of the laminations are connected by corner portions which are convexly rounded as shown in order not to crease or injure the diaphragm tube especially in the collapsed position illustrated.

What I claim as my invention is:

1. In an accumulator having a casing, a flexible diaphragm comprising a deformable tube supported within the casing and cooperating with the walls of the casing to form a chamber around said tube, means for introducing fluid under pressure into said chamber to contract said tube, a backing for said tube comprising a tube supported within said deformable tube, said backing tube comprising a plurality of layers of material arranged in juxtaposition to each other axially of said backing tube and having passages for fluid between adjacent surfaces of said layers, and a supporting strut extending axially of said backing tube within the latter and engageable with the inner surface of said backing tube at points spaced from each other circumferentially of said backing tube.

2. An accumulator as defined in claim 1 in which said strut is provided with circumferentially spaced radially outwardly projecting fins extending for substantially the full length of said backing tube and engageable with the inner surface of the latter.

3. In an accumulator having a casing, a flexible diaphragm comprising a deformable tube supported within the casing and cooperating with the walls of the casing to form a chamber around said tube, means for introducing fluid under pressure into said chamber to contract said tube, a backing for said tube comprising a tube supported within said deformable tube, said backing tube comprising a multiplicity of generally triangularly shaped centrally apertured discs arranged in juxtaposition to each other axially of said backing tube and having restricted passages for fluid between adjacent surfaces of said discs extending outwardly from the central apertures in said discs to the outer edges thereof, the outer side edges of said discs being concave and connected by convexly rounded edge portions.

4. An accumulator as defined in claim 3 including a supporting strut extending axially of said backing tube within the latter and having radially outwardly projecting fins extending for substantially the full length of said backing tube and engageable with the radially inner edges of said discs at circumferentially spaced points.

5. In an accumulator having a casing, a flexible diaphragm comprising a deformable tube supported within the casing and cooperating with the walls of the casing to form a chamber around said tube, means for introducing fluid under pressure into said chamber to contract said tube, a tube extending axially of said deformable tube within the latter and having a permeable wall forming a backing for engagement by the deformable tube upon collapse of the latter, and a strut extending through said backing tube and engageable with the inner surface of said backing tube at circumferentially spaced points.

6. In an accumulator having a casing, a flexible diaphragm comprising a deformable tube supported within the casing and cooperating with the walls of the casing to form a chamber around said tube, means for introducing fluid under pressure into said chamber to contract said tube, a tube extending axially of said deformable tube within the latter and having a permeable wall forming a backing for engagement by the deformable tube upon collapse of the latter, and a strut extending through said backing tube and having longitudinally extending radially outwardly projecting fins engageable with the inner surface of said backing tube at circumferentially spaced points, said fins extending for substantially the full length of said backing tube.

7. An accumulator comprising a casing open at one end, a head closing the open end of said casing, said head having a hub portion projecting into said casing and a passage for fluid extending through said hub portion, a diaphragm comprising a tube of elastic deformable material having one end sleeved on said hub portion to provide a tight fluid seal and communicating with said passage, and a ring embracing and gripping the end aforesaid of said tube, said ring engaging the inner surface of said head and the adjacent inner surface of said casing to provide a tight fluid seal between said casing and head, said ring being formed of elastic deformable material enabling said ring to be deformed by an increase in pressure within said casing exteriorly of said tube, thereby increasing the sealing action of said ring between said casing and head and increasing the gripping action of said ring on said one end of said tube to increase the sealing action between said tube and hub portion.

8. The structure defined in claim 7, said head having a charging port therein, said ring having a bore registering with said port, and a pressure inlet nozzle of sintered material extending from said port into said bore and having a discharge passage at the inner end, said ring having a passage therein providing communication between the discharge passage and the interior of the casing radially outwardly of said tube.

9. The structure defined in claim 7 in which the outer surface of said hub portion is formed with axially spaced circumferentially extending grooves, and means disposed between said tube and ring deforming and firmly clamping the adjacent portions of said tube into said grooves to provide a fluid tight seal between said hub portion and tube.

10. An accumulator comprising a casing open at one end, a head closing the open end of said casing, said head having a hub portion projecting into said casing and a passage for fluid extending through said hub portion, a diaphragm comprising a tube of elastic deformable material having one end sleeved on said hub portion to provide a tight fluid seal and communicating with said passage, and a ring embracing and gripping the end aforesaid of said tube, said ring engaging the inner surface of said casing to provide a tight fluid seal, said ring being formed of elastic deformable material enabling said ring to be deformed radially by an increase in pressure within said casing exteriorly of said tube, thereby increasing the sealing action of the ring with said casing and increasing the gripping action of said ring on said one end of said tube to increase the sealing action between said tube and hub portion.

11. In an accumulator having a casing, a flexible diaphragm comprising a deformable tube supported within the casing and cooperating with the walls of the casing to form a chamber around said tube, means for introducing fluid under pressure into said chamber to contract said tube, a backing for said tube comprising a tube supported within said deformable tube, said backing tube comprising a plurality of layers of material arranged in juxtaposition to each other axially of said backing tube and having passages for fluid between adjacent surfaces of said layers, said layers comprising a ribbon extending helically around the axis of said backing tube, adjacent convolutions of said ribbon being disposed in juxtaposition axially of said backing tube and having restricted passages for fluid between adjacent surfaces of said convolutions.

12. An accumulator comprising a casing, a diaphragm tube of flexible deformable material supported within said casing and cooperating with the walls of said casing to form a chamber around said tube, means for introducing fluid under pressure into said chamber to contract said tube, a backing tube for said diaphragm tube supported within the latter, means providing an opening for fluid in said casing communicating with the interior of said backing tube, said backing tube comprising a plurality of circumferentially extending layers of material arranged in generally concentric relation to the axis of said backing tube, said layers of material also being arranged in juxtaposition to each other axially of said backing tube with the adjacent surfaces of said layers of material cooperating to define therebetween a multiplicity of highly restricted passages extending generally radially through the wall of said backing tube, said multiplicity of passages preventing extrusion of the diaphragm tube through said passages when contracted by fluid pressure in said chamber by reason of the highly restricted nature of said passages and at the same time permitting a relatively free flow of fluid in either direction through the wall of said backing tube without appreciable pressure drop during operation of the accumulator.

13. An accumulator as defined in claim 12 in which said layers of material comprise a multiplicity of individual coaxially arranged rings.

14. An accumulator as defined in claim 12 in which the radially outer edges of said layers of material are triangularly shaped to impart a similar shape to the radially outer surface of said backing tube along the length of the latter, the triangular configuration of said backing tube permitting said diaphragm tube to flex substantially during its charge and discharge function without stretching.

15. An accumulator as defined in claim 14 in which said diaphragm tube is relatively closely confined between said casing and the apices of said backing tube to limit the stretching of said diaphragm tube during the operation of the accumulator.

References Cited in the file of this patent
UNITED STATES PATENTS

| | | |
|---|---|---|
| 661,109 | Schmitz | Nov. 6, 1900 |
| 2,267,121 | McMullen et al. | Dec. 23, 1941 |
| 2,278,688 | Caminez | Apr. 7, 1942 |
| 2,583,231 | Ragland | Jan. 22, 1952 |
| 2,609,001 | Hebard | Sept. 2, 1952 |
| 2,635,641 | Kasten | Apr. 12, 1953 |